(12) United States Patent  
Jang et al.

(10) Patent No.: US 9,003,561 B1  
(45) Date of Patent: Apr. 7, 2015

(54) DEVICE AND METHOD FOR MEASURING DISTRIBUTION OF ATOMIC RESOLUTION DEFORMATION

(71) Applicants: Korea Institute of Machinery & Materials, Daejeon (KR); Brown University, Providence, RI (US)

(72) Inventors: Bong Kyun Jang, Daejeon (KR); Jae-Hyun Kim, Daejeon (KR); Hak Joo Lee, Daejeon (KR); Kyung-Suk Kim, Providence, RI (US); Chien-Kai Wang, Providence, RI (US)

(73) Assignees: Korea Institute of Machinery & Materials, Daejeon (KR); Brown University, Providence, RI (US)

( * ) Notice: Subject to any disclaimer, the term of this patent is extended or adjusted under 35 U.S.C. 154(b) by 0 days.

(21) Appl. No.: 14/249,424

(22) Filed: Apr. 10, 2014

Related U.S. Application Data

(60) Provisional application No. 61/810,299, filed on Apr. 10, 2013.

(51) Int. Cl.  
*G01Q 70/06* (2010.01)  
*G01Q 20/02* (2010.01)

(52) U.S. Cl.  
CPC ...................... *G01Q 20/02* (2013.01)

(58) Field of Classification Search  
USPC ................................. 850/6, 52, 55  
See application file for complete search history.

(56) References Cited

U.S. PATENT DOCUMENTS 5,540,958 A    7/1996   Bothra  
2010/0235955 A1*   9/2010   Humphris ................ 850/6

FOREIGN PATENT DOCUMENTS

KR    10-2004-0092608    11/2004  
KR    10-2006-0024470    3/2006  
KR    10-2010-0092991    8/2010

* cited by examiner

*Primary Examiner* — Nicole Ippolito  
*Assistant Examiner* — Hanway Chang  
(74) *Attorney, Agent, or Firm* — Lexyoume IP Meister, PLLC

(57) ABSTRACT

The present invention relates to an atomic resolution deformation distribution measurement device that can measure a deformation rate of an atomic scale with low expense by improving resolution using an AFM system, and the atomic resolution deformation distribution measurement device includes: a laser source generating a laser beam; a first cantilever and a second cantilever provided close to a measurement specimen or a reference specimen to cause deformation by an atomic force; an optical system controlling a light path of the laser beam so as to cause the laser beam to be sequentially reflected to the first cantilever and the second cantilever and locate the first cantilever and the second cantilever to an image point; a measurement unit measuring the laser beam reflected from the second cantilever; and a stage on which a measurement specimen or a reference specimen is located and movable in X, Y, and Z axis directions.

37 Claims, 8 Drawing Sheets

DEVICE AND METHOD FOR MEASURING DISTRIBUTION OF ATOMIC RESOLUTION DEFORMATION

CROSS-REFERENCE TO RELATED APPLICATION

This application claims priority to and the benefit of U.S. Patent Application No. 61/810,299 filed in the USPTO on Apr. 10, 2013, the entire contents of which are incorporated herein by reference.

BACKGROUND OF THE INVENTION (a) Field of the Invention

The present invention relates to a device and method for measuring distribution of atomic resolution deformation, and a method thereof.

(b) Description of the Related Art

The development of nanotechnology has had a ripple effect on various technology fields such as biological fields, energy fields, environmental fields, information fields, and the like. In application of nanotechnology, importance of a method for precise measuring of location and deformation in a nano/micro structure has been highlighted.

In general, a transmission electron microscope (TEM) is used to measure deformation of atomic scale. The transmission electron microscope focuses electron beam and irradiates an electron beam to a sample, and enlarges the electron beams passed through the sample to acquire an image. That is, the transmission electron microscope measures a defect or deformation of the nano-scale through the atomic lattice structure. The transmission electron microscope is advantageous in observing an atomic structure of a material with high magnification, but it is difficult to manufacture a specimen that can be observed using a transmission electron microscope, and manufacturing cost is high. In addition, the transmission electron microscope cannot observe a large-scale target, and only measures a shape after deformation of a specimen so that data such as deformation rate measurement cannot be easily acquired.

A scanning probe microscope (SPM) is widely used for measuring a nano-sized structure. The scanning probe microscope includes various types, and a scanning tunneling microscope (STM) is the first scanning tunneling microscope that scans by approaching a probe tip made of a rigid and stable metal (e.g., tungsten) having a pointed end to a specimen to be measured. The second common scanning probe microscope is an atomic force microscope (AFM), and a small bar called a cantilever manufactured by micro-machining is used instead of a tungsten needle of the STM.

The AFM operates as follows. A probe pin (or a cantilever) is as thin as the size of several atoms, and an interaction force is generated between an atom at the end of the probe pin and atoms in the surface of the specimen when the probe pin closely approaches the specimen surface. The interaction force is usually Van der Waals force and is as weak as less than nN ($10^{-9}$ N). However, resonance of the cantilever is changed by such a weak force, and a degree of bending of the cantilever or a variation of the resonance of the cantilever is measured using a laser or a photodiode so as to measure a nano-scale structure such as a curve at a surface of a measurement specimen. In detail, a method that is most widely used measures displacement by measuring a laser beam transmitted to the cantilever rather than a reflection therefrom using a position sensitive detector PSD (or a position sensitive photodiode detector, PSPD).

The scanning probe microscope is widely used because it can easily measure the shape of a specimen surface, and unlike the transmission electron microscope, a specimen can be simply prepared with a low cost. However, the scanning probe microscope has a limit in measurement resolution so that it cannot measure an atomic structure of a target.

In measurement of such a nano-scale structure, various methods have been disclosed in various points of view for improvement of resolution.

Korean Patent Publication No. 2006-0024470 ("Methodology for nano scale material joint and welding using Scanning Electron Microscope", 2006 Mar. 17) disclosed a method for enhancing a circuit structure of a probe tip current to maximize a discharging current for improvement of resolution. Korean Patent No. 1060506 ("System and method of lithography in atomic force microscope and for generating input signal to use on lithography thereof", 2011 Aug. 24) disclosed an algorithm that realizes image lithography with a raster method using a scanning probe microscope to improve resolution. Korean Patent No. 0496457 ("Head of atomic force microscope", 2005 Jun. 13) discloses a structure for improvement of an alignment structure of an SPM and PSPD for improvement of resolution. As described, various methods for improvement of resolution of the scanning probe microscope have been disclosed, but none of the methods provide an effect that overcomes the limit in the scanning probe microscope.

U.S. Pat. No. 5,540,958 ("Method of making microscope probe tips", 1996 Jul. 30) disclosed a method for manufacturing AFM probe tips respectively having different resolution to widen a measurement available range. However, the method also cannot overcome a performance limit of the scanning probe microscope.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an atomic resolution deformation distribution measurement device that can improve resolution of an atomic micrograph system to observe an atomic structure of a measurement specimen, and a method thereof.

An atomic resolution deformation distribution measurement device according to the present invention includes: a laser source generating a laser beam; a first cantilever and a second cantilever provided close to a measurement specimen or a reference specimen to cause deformation by an atomic force; an optical system controlling a light path of the laser beam so as to cause the laser beam to be sequentially reflected to the first cantilever and the second cantilever and locate the first cantilever and the second cantilever to an image point; a measurement unit measuring the laser beam reflected from the second cantilever; and a stage on which a measurement specimen or a reference specimen is located and movable in X, Y, and Z axis directions.

In this case, one of the first cantilever and the second cantilever is located on the measurement specimen and the other is located on the reference specimen, and the measurement measures a result of overlapping of atom lattice location data of a surface of the measurement specimen and atom lattice location data of a surface of the reference specimen so as to measure atom lattice data of the measurement specimen that is deformed with respect to the atom lattice of the reference specimen.

In addition, the optical system may include at least one mirror and at least one convex lens.

In a first exemplary embodiment, the optical system may include a mirror and a convex lens, and forms a light path through such that the laser beam generated from the laser source is transmitted to the measurement device by being sequentially transmitted or reflected through the first cantilever, the mirror, the convex lens, and the second cantilever. In the optical system, it is preferred that the length of the light path between the first cantilever, the mirror, and the convex lens and the length of the light path between the convex lens and the second cantilever are respectively set to be two times a focal distance of the convex lens. In the optical system, the mirror and the convex lens are formed to be movable and the mirror is formed to be rotatable.

In a second exemplary embodiment, the optical system includes a first mirror, a second mirror, and a convex lens, and forms a light path such that the laser beam generated from the laser source is transmitted to the measurement device by being sequentially transmitted or reflected through the first cantilever, the first mirror, the convex lens, the second mirror, and the second cantilever. In this case, in the optical system, the length of the light path between the first cantilever, the first mirror, and the convex lens and the length of the light path between the convex lens, the second mirror, and the second cantilever are respectively set to be two times the focal distance of the convex lens. In the optical system, the first mirror and the second mirror are formed to be movable and rotatable.

In a third exemplary embodiment, the optical system includes a mirror, a first convex lens, and a second convex lens, and forms a light path such that laser beam generated from the laser source is transmitted to the measurement unit by being sequentially transmitted or reflected through the first cantilever, the first convex lens, the mirror, the second convex lens, and the second cantilever. In this case, in the optical system, the first convex lens and the second convex lens respectively have the same focal distance. In the optical system, the length of the light path between the first cantilever and the first convex lens and the length of the light path between the second convex lens and the second cantilever are respectively set to be a focal distance of the first convex lens or a focal distance of the second convex lens, and the length of the light path between the first convex lens and the second convex lens are set to be two times a focal distance of the first convex lens or a focal distance of the second convex lens. In the optical system, the mirror, the first convex lens, and the second convex lens are formed to be movable and the mirror is formed to be rotatable. Alternatively, a unit body is provided in a fixed manner in the optical system to set the length of the light path between the first convex lens and the second convex lens, to be two times the focal distance of the first convex lens or the focal distance of the second convex lens, and the unit body is formed to be movable and rotatable.

In a fourth exemplary embodiment, the optical system includes a first mirror, a second mirror, a third mirror, and a convex lens, and forms a light path such that the laser beam generated from the laser source is transmitted to the measurement unit by being sequentially transmitted or reflected through the first cantilever, the first mirror, the convex lens, the second mirror, the convex lens, the third mirror, and the second cantilever. In this case, in the optical system, the length of the light path between the first cantilever, the first mirror, and the convex lens, the length of the light path between the convex lens and the second mirror, and the length of the light path between the convex lens, the third mirror, and the second cantilever are preferably respectively set to be a focal distance of the convex lens. In this case, in the optical system, the second mirror and the convex lens are formed to be movable and the second mirror is formed to be rotatable. Alternatively, the optical system may include a unit body formed in a fixed manner to set the length of the light path between the convex lens and the second mirror to be the focal distance of the convex lens, and the unit body is formed to be movable and rotatable.

In a fifth exemplary embodiment, the optical system includes a mirror, a convex lens, and a beam splitter, and forms a light path such that laser beam generated from a laser source is transmitted to the measurement unit by being sequentially transmitted or reflected through the first cantilever, the beam splitter, the convex lens, the mirror, the convex lens, the beam splitter, and the second cantilever. In this case, in the optical system, the length of the light path between the first cantilever, the beam splitter, and the convex lens, the length of the light path between the convex lens and the mirror, and the length of the light path between the convex lens, the beam splitter, and the second cantilever are preferably set to be a focal distance of the convex lens. In this case, in the optical system, the mirror and the convex lens are formed to be movable and the mirror is formed to be rotatable. Alternatively, the optical system includes a unit body formed in a fixed manner to set the length of the light path between the convex lens and the mirror to be the focal distance of the convex lens, and the unit body is formed to be movable and rotatable.

In a sixth exemplary embodiment, the optical system includes a first mirror, a second mirror, a third mirror, a convex lens, a prism, and a beam splitter, and forms a light path such that laser beam generated from a laser beam is transmitted to the measurement unit by being sequentially transmitted and reflected through the prism, the beam splitter, the first cantilever, the first mirror, the convex lens, the second mirror, the convex lens, the first mirror, the second cantilever, the beam splitter, and the second mirror. In this case, in the optical system, the length of the light path between the first cantilever, the first mirror, and the convex lens, the length of the light path between the convex lens and the second mirror, and the length of the light path between the convex lens, the first mirror, and the second cantilever are preferably respectively set to be the focal distance of the convex lens. In the optical system, the second mirror and the convex lens are formed to be movable and the second mirror and the beam splitter are formed to be rotatable.

Alternatively, the optical system comprises at least one concave mirror.

In a seventh exemplary embodiment, the optical system includes a concave mirror, and forms a light path such that laser beam generated from a laser source is transmitted to the measurement unit by being sequentially transmitted or reflected through the first cantilever, the concave mirror, and the second cantilever. In this case, in the optical system, the length of the light path between the first cantilever and the concave mirror and the length of the light path between the concave mirror and the second cantilever are preferably set to be two times a focal distance of the concave mirror. In this case, in the optical system, the concave mirror is formed to be movable and rotatable.

In an eighth exemplary embodiment, the optical system includes a first concave mirror and a second concave mirror, and forms a light path such that laser beam generated from a laser source is transmitted to the measurement unit by being sequentially transmitted or reflected through the first cantilever, the first concave mirror, the second concave mirror, and the second cantilever. In this case, in the optical system, the length of the light path between the first cantilever and the first concave mirror and the length of the light path between the second concave mirror and the second cantilever are respectively set to be the focal distance of the concave mirror, and the length of the light path between the first concave mirror and the second concave mirror is set to be two times the focal distance of the concave mirror. In the optical system, the first concave mirror and the second concave mirror are formed to be movable and the second concave mirror is formed to be rotatable.

The measurement unit may be a position sensitive photodiode detector (PSPD).

In addition, the stage is connected with the measurement unit and is movable in the Z-axis direction by being fed back based on a measurement value of the laser beam measured by the measurement unit.

A method for measuring atomic resolution deformation distribution using the above-described device includes: disposing one of the first cantilever and the second cantilever on a measurement specimen and the other on a reference specimen; controlling a light path for the laser beam generated from the laser source by the optical system to sequentially reflect the laser beam to the first cantilever and the second cantilever; and measuring the laser beam reflected from the second cantilever and then transmitted to the measurement unit.

In this case, the measurement unit measures a result of overlapping of atom lattice location data of a surface of a measurement specimen and atom lattice location data of a surface of a reference specimen so as to measure atom lattice data of a measurement specimen that is deformed with respect to the atom lattice of the reference specimen.

The method further includes: calculating the square of a measurement signal transmitted to the measurement unit; eliminating noise by passing the square of the measurement through a low-pass filter; digitalizing the square of the measurement signal of which noise is eliminated through an analog-to-digital converter; and converting an atomic lattice structure of the measurement specimen that is deformed with respect to the atomic lattice of the reference specimen using the digitalized value.

According to the present invention, a limit in improvement or resolution of a conventional scanning probe microscope is overcome to observe lattice arrangement information of atoms of a measurement specimen using a scanning microscope system. Since the present invention is based on the scanning probe microscope system, the present invention is also advantageous in that a spacemen for measurement can be simply prepared. Thus, a conventional problem in that when the TEM is used, high expense is required due to equipment itself and preparation of a specimen for observation of an atom-scale structure can be solved, thereby performing measurement economically. Furthermore, the present invention is also based on a scanning probe microscope system, and thus, unlike the TEM, large-scale measurement and deformation rate measurement can be performed and user-desired data can be more precisely and variously measured.

DETAILED DESCRIPTION OF THE EMBODIMENTS

Hereinafter, a device for measuring distribution of atomic resolution deformation and a method thereof according to the present invention will be described in detail with reference to the accompanying drawings.

Figure 1:
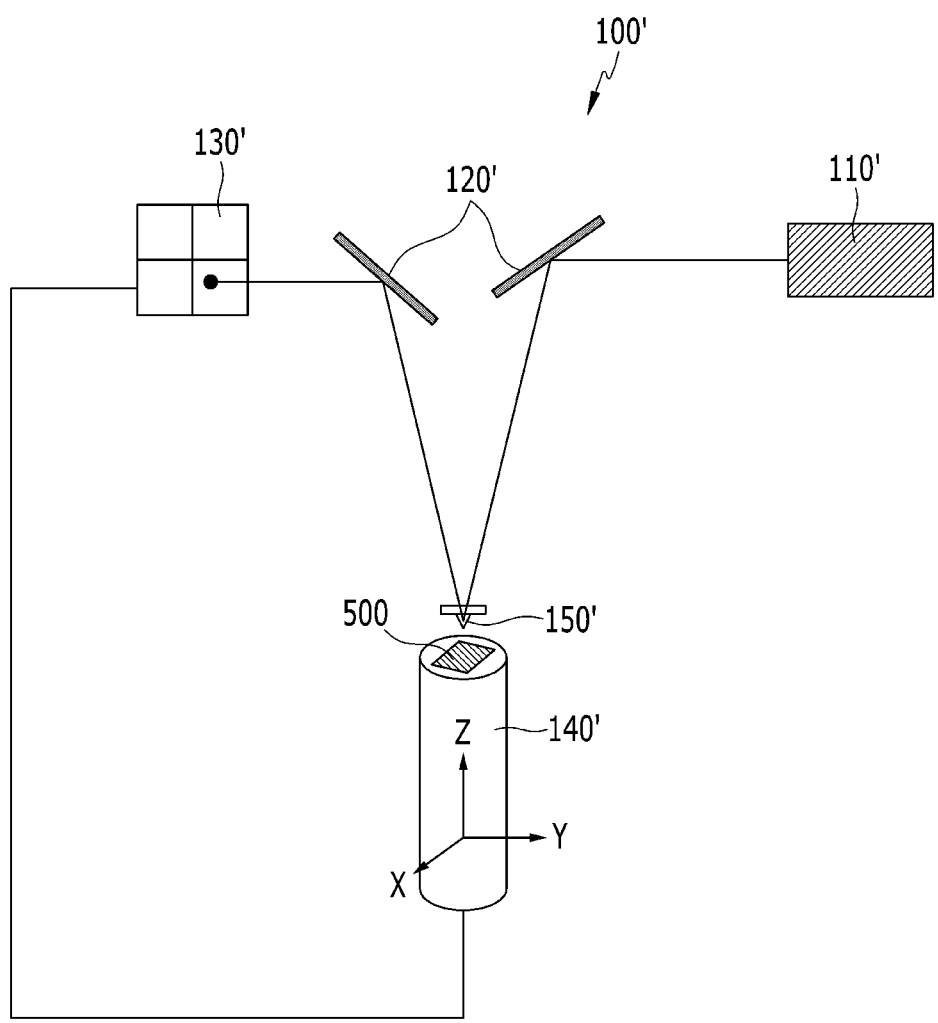
FIG. 1 shows a basic structure of a conventional AFM.

FIG. 1 shows a basic structure of a conventional atomic force microscope (AFM). As shown in FIG. 1, a conventional atomic force microscope (AFM) includes a laser source 110', a mirror 120, a position sensitive photodiode detector (PSPD) 130', a stage 140', and a cantilever 150'. An operating mechanism of the AFM is as follows. A measurement specimen 500 is located on the stage 140', and the cantilever 150' is disposed close to the measurement specimen 500. Laser beams generated from the laser source 110' are irradiated to the cantilever 150' and then reflected, and the PSPD 130' measures the reflected laser beam. In this case, at least one mirror 120' is used to properly control a light path of the laser beam. As previously described, when the cantilever 150' is disposed close to the measurement specimen 500, deformation occurs in the cantilever 150' due to an atomic force, and accordingly, a measurement value of the PSDP 130' is changed. With such a mechanism, a structure such as a surface curve of the measurement specimen 500 can be calculated. In general, the stage 140' is movable in the X-Y direction (i.e., a plane direction) as desired, and is connected with the PSPD 130', and can be moved in the Z-axis direction by feedback according to a measurement value from the PSPD 130'.

Resolution of such a conventional AFM is determined by the size and shape of the cantilever 150', and the conventional AFM cannot precisely measure a target that is similar to the cantilever in the side. Thus, an atomic-scaled structure cannot be measured. In order to solve such a problem, the present invention employs an optical system that can control a laser beam path for sequential reflection of the irradiated laser beams two cantilevers, and at the same time, disposes the two cantilevers on an image point to thereby improve resolution of the convention AFM.

Figure 2:
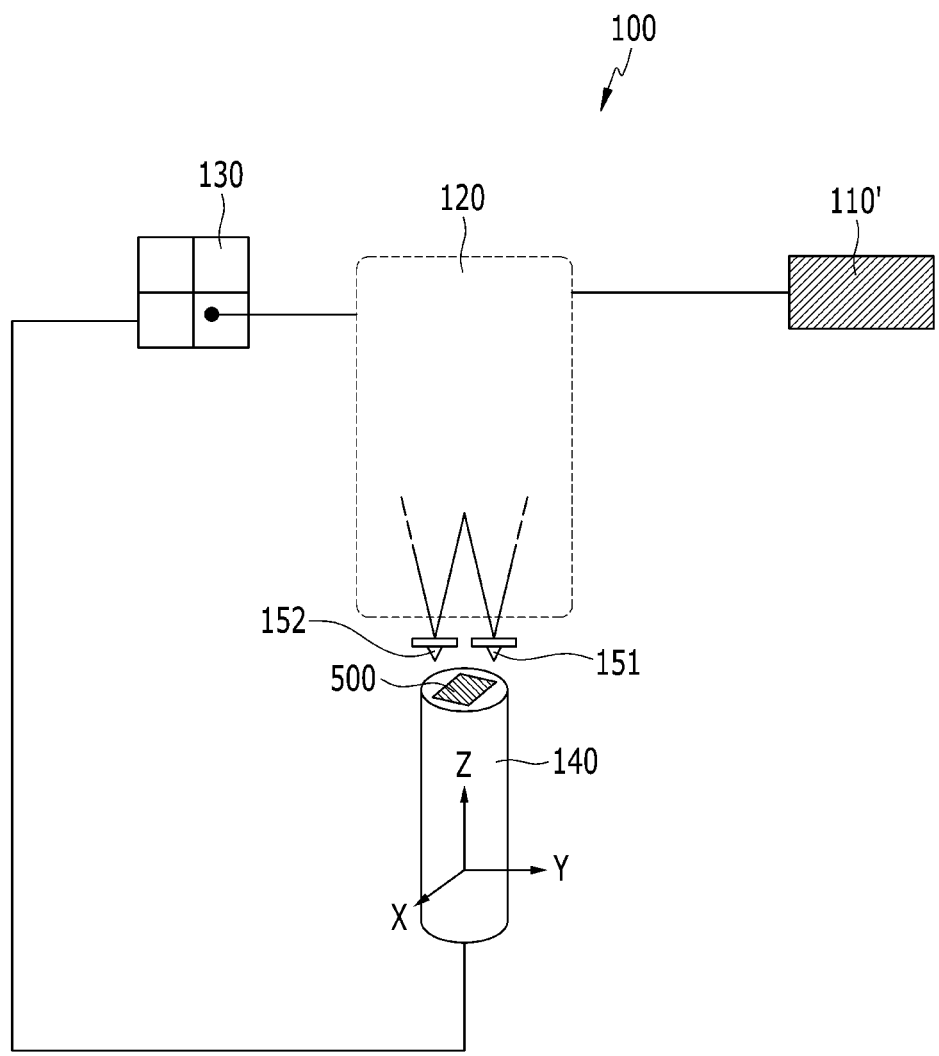
FIG. 2 is a conceptual view of a device for measuring distribution of deformation using atomic resolution according to the present invention.

FIG. 2 is a conceptual view of a device for measuring distribution of atomic resolution deformation. As described above, an atomic resolution deformation distribution measurement device 100 according to the present invention includes a laser source 110, an optical system 120, a measurement unit 130, a stage 140, a first cantilever 151, and a second cantilever 152. In the atomic resolution deformation distribution measurement device 100, the laser source 110, the measurement unit 130, and the stage 140 are respectively almost the same as the laser source 110', the PSPD 130', and the stage 140' of the conventional AFM 100'. That is, the laser source 110 generates laser beams, the measurement unit 130 may be formed as a PSPD, and the stage 140 is connected with the measurement unit 130 and can be moved in the Z-axis direction by feedback based on a value of measured laser beam from the measurement unit 130.

However, unlike the conventional AFM 100', two cantilevers 151 and 152 are used instead of using one cantilever, and the optical system 120 controls a laser beam path to sequentially reflect the laser beams to the first cantilever 151 and the second cantilever 152 in the present invention. The optical system 120 will be described in detail through various exemplary embodiments later, and thus a description of a structure of the optical system 120 of FIG. 2 will be omitted.

In detail, one of the first cantilever 151 and the second cantilever 152 is disposed on a measurement specimen and the other is disposed on a reference specimen. In FIG. 2, the measurement specimen and the reference specimen are illustrated as the specimen 500 for convenience of description, and the measurement specimen and the reference specimen may be formed as an integral specimen 500 as shown in the drawing or may be formed as separated independent specimens. Hereinafter, the term "specimen" will refer to the measurement specimen or the reference specimen, and the term "cantilever" will refer to the first cantilever 151 or the second cantilever 152.

As previously described, when the cantilever and the specimen are disposed close to each other, the cantilever is bent due to an atomic force between atoms respectively forming the cantilever and the specimen. Conventionally, a cantilever is deformed as a laser beam is reflected to the cantilever and then transmitted to the PSPD, and a surface curve of the specimen is magnified using a value of an input signal that is changed according to deformation of the cantilever. In the present invention, the laser beam is sequentially reflected to the first cantilever 151 and the second cantilever 152 by the optical system 120 and then transmitted to the measurement unit 130, and thus a result of overlapping atomic lattice location data of the surface of the measurement specimen and atomic lattice location data of the reference specimen surface are observed in the measurement unit 130. That is, the device 100 measures atomic lattice data of a measurement specimen that is deformed with respect to the atomic lattice of the reference specimen.

Figure 3:
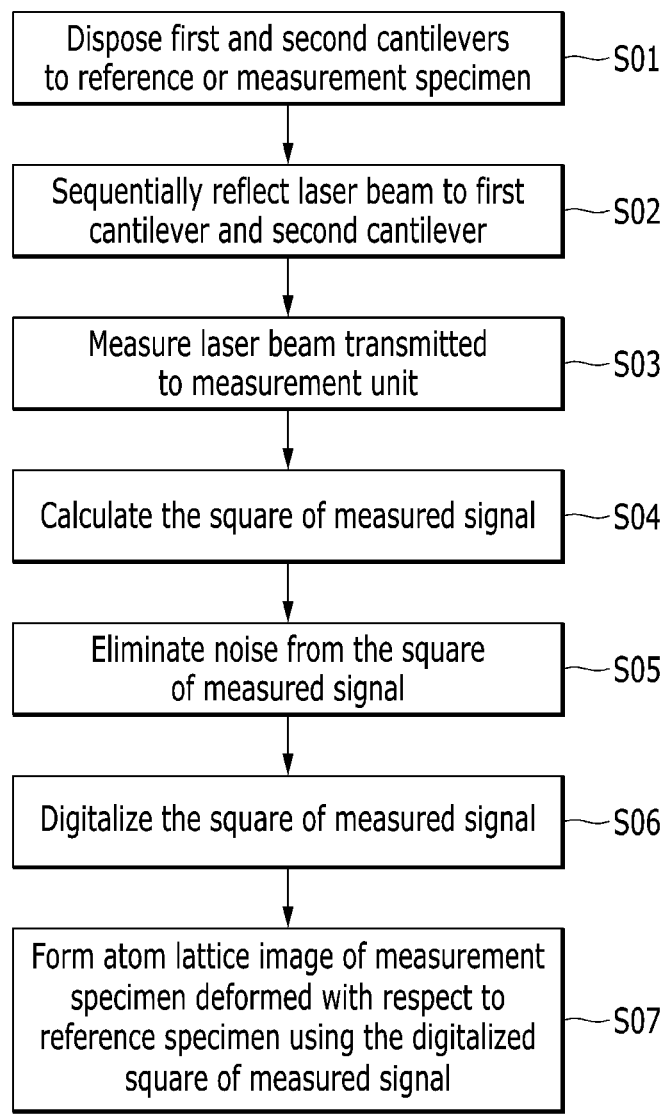
FIG. 3 is a flowchart of a method for measuring distribution of deformation using atomic resolution according to the present invention.

FIG. 3 shows a flowchart of a method for measuring atomic resolution deformation distribution, and processes (S01 to S03) through which the laser beam irradiated from the laser source 110 is sequentially reflected to the first cantilever 151 and the second cantilever 152 and then transmitted to the measurement unit 130 are the same as in the previous description. With respect to the measurement signal transmitted to the measurement unit 130, the square of the measurement signal is calculated first (S04), and then noise is eliminated from the signal through a low-pass filter (S05). A frequency band used as a reference in noise elimination in the low-ass filter can be appropriately modified by a user or by a theoretical or experiential method. Next, the square of the measurement signal from which the noise is eliminated is digitalized through an analog-to-digital converter (S06), and an atomic lattice structure of the measurement specimen that is deformed with respect to the atomic lattice of the reference specimen is converted to an image format using the digitalized value (S07).

Through such a process, atomic lattice data of the measurement specimen deformed with respect to the atomic lattice of the reference specimen is measured. According to the device and the method of the present invention, measurement resolution can be improved compared to the AFM system, and an interferometer is formed by using two cantilevers in the AFM system in the present invention so that atomic-scale deformation in a large area can be measured at a high speed.

The conventional AFM has a limit in resolution, and thus an atomic structure cannot be easily measured, and the conventional TEM cannot measure a large-sized specimen and can measure only a shape of the specimen after deformation of the specimen so that a deformation rate cannot be measured, and particularly, a specimen cannot be simply manufactured, thereby causing an increase of measurement expense. However, in the present invention, the measurement resolution can be improved by using the interferometer even though the AFM is applied, and at the same time, the atomic-scale deformation rate can be measured so that resolution can be more improved (compared to the convention AFM) and economic efficiency can be improved (compared to the conventional TEM).

Hereinafter, various exemplary embodiments of the optical system 120 will be described. Any type of optical systems that can sequentially reflect a laser beam to the first cantilever 151 and the second cantilever 152 and dispose the first and second cantilevers 151 and 152 are respectively disposed on an image point are applicable.

FIG. 4 to FIG. 9 respectively illustrate first to sixth exemplary embodiments in which the optical system 120 is formed of at least one mirror and at least one convex lens.

Figure 4:
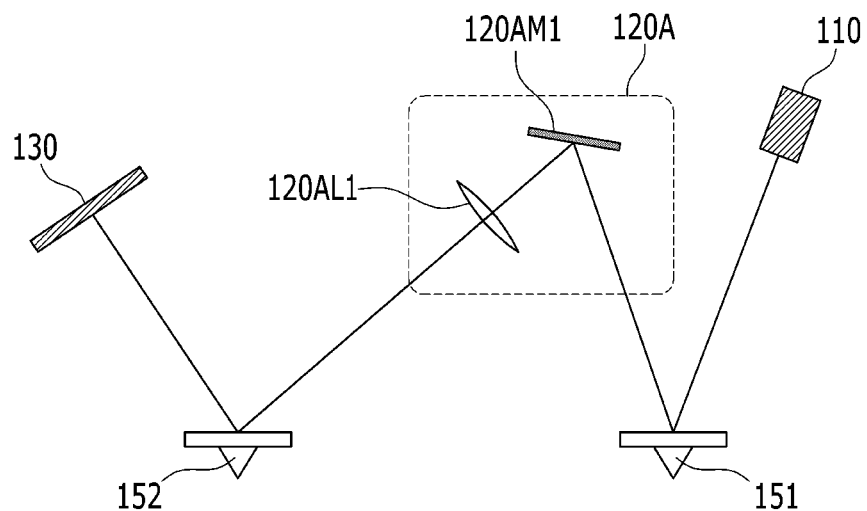
FIG. 4 illustrates a device for measuring distribution of deformation using atomic resolution according to a first exemplary embodiment of the present invention.

FIG. 4 shows a first exemplary embodiment of the atomic resolution deformation distribution measurement device according to the present invention. An optical system 120A according to the first exemplary embodiment includes a mirror 120AM1 and a convex lens 120AL1, and a light path is formed such that a laser beam generated from the laser source 110 is transmitted to a measurement unit 130 by being sequentially transmitted or reflected to the first cantilever, the mirror 120AM1, the convex lens 120AL1, and the second cantilever.

In this case, in order to locate the first and second cantilevers 151 and 152 at the image point, it is preferred to set the length of the light path between the first cantilever 151, the mirror 120AM1, the convex lens 120AL1 and the length of the light path between the convex lens 120AL1 and the second cantilever 152 to be respectively double a focal distance of the convex lens 120AL1.

In addition, when one of the first cantilever 151 and the second cantilever 152 is replaced or a different type of cantilever is used and thus the location of the cantilever is changed, locations or directions of optical parts should be modified to locate the cantilevers back to the image point. When the convex lens 120AL1 has a fixed focal distance, the mirror 120AM1 and the convex lens 120AL1 are formed to be movable and the mirror 120AM1 is formed to be rotatable in the optical system 120A of the first exemplary embodiment. As an example, movement driving means are provided for 2 degrees of freedom of location movement in the mirror 120AM1 for distance control, and rotation driving means are provided in the mirror 120AM1 for 2 degrees of freedom of direction rotation, and the convex lens 120AM1 may include movement driving means so as to control a distance while being subordinate to movement of the mirror 120AM1. Hereinafter, locations or directions of optical parts can be modified to locate the cantilevers back to the image point in another exemplary embodiment, and therefore driving means similar to the movement driving means and the rotation driving means are included in other exemplary embodiments. Accordingly, means for modification of locations or directions of optical parts will be briefly described in the other exemplary embodiments, and portions that are not described in the following exemplary embodiments are based on the description of the first exemplary embodiment.

Figure 5:
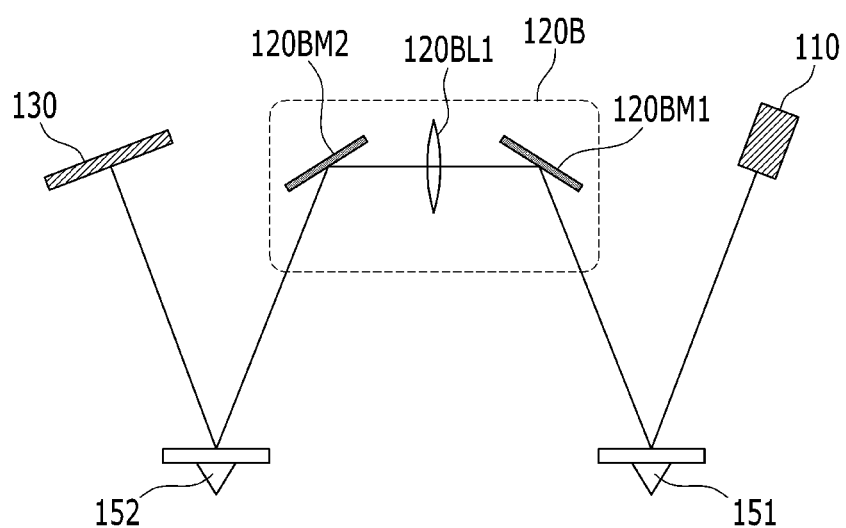
FIG. 5 illustrates a device for measuring distribution of deformation using atomic resolution according to a second exemplary embodiment of the present invention.

FIG. 5 illustrates a second exemplary embodiment of the atomic resolution deformation distribution measurement device of the present invention. As shown in FIG. 5, an optical system 120B of the second exemplary embodiment includes a first mirror 120BM1, a second mirror 120BM2, and a convex lens 120BL1, and a light path is formed such that a laser beam generated from the laser source 110 is transmitted to a measurement unit 130 by sequential transition or reflection to the first cantilever 151, the first mirror 120BM1, the convex lens 120BL1, the second mirror 120BM2, and the second cantilever 152.

In this case, in order to locate the first and second cantilevers 151 and 152 to the image point, the length of the light path between the first cantilever 151, the first mirror 120BM1, and the convex lens 120BL1, and the length of the light path between the convex lens 120BL1, the second mirror 120BM2, and the second cantilever 152, are preferably set to be two times a focal distance of the convex lens 120BL1.

In this case, the first mirror 120BM1 and the second mirror 120BM2 of the optical system 120B according to the second exemplary embodiment are formed to be movable and rotatable. As an example, the first mirror 120BM1 and the second mirror 120BL2 are respectively provided with a movement driving means of one degree of freedom, and a rotation driving means of two degrees of freedom.

Figure 6:
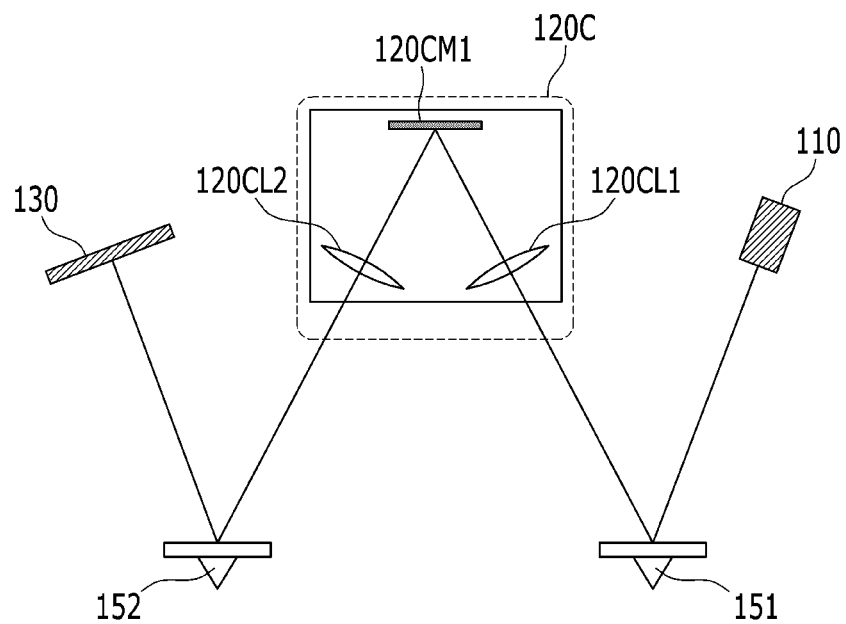
FIG. 6 illustrates a device for measuring distribution of deformation using atomic resolution according to a third exemplary embodiment of the present invention.

FIG. 6 illustrates a third exemplary embodiment of the atomic resolution deformation distribution measurement device of the present invention. As shown in FIG. 6, an optical system 120C according to the third exemplary embodiment includes a mirror 120CM1, a first convex lens 120CL1, and the second convex lens 120CL2, and a light path is formed such that a laser beam generated from a laser source 110 is transmitted to a measurement unit 130 by sequentially being transmitted or reflected through a first cantilever 151, the first convex lens 120CL1, the mirror 120CM1, the second convex lens 120CL2, and the second cantilever 152.

In this case, in the optical system 120C according to the third exemplary embodiment, it is preferred that a focal distance of the first convex lens 120CL1 and a focal distance of the second convex lens 120CL2 are set to be equal to each other so as to locate the first and second cantilevers 151 and 152 to the image point with ease. In this case, it is preferred that the length of the light path between the first cantilever 151 and the first convex lens 120CL1 and the length of the light path between the second convex lens 120CL2 and the second cantilever 152 are respectively set to be the focal distance of the first or second convex lens 120CL1 or 120CL2, and the length of the light path between the first convex lens 120CL1, the mirror 120CM1, and the second convex lens 120CL2 are set to be two times the focal distance of the first or second convex lens 120CL1 or 120CL2 in the optical system 120C according to the third exemplary embodiment.

In this case, the mirror 120CM1, the first convex lens 120CL1, and the second convex lens 120CL2 are formed to be movable, and the mirror 120CM1 is formed to be rotatable in the optical system 120C of the third exemplary embodiment. As an example, the mirror 120BM1 is provided with a movement driving means of two degrees of freedom and a rotation driving means of two degrees of freedom, and the first convex lens 120CL1 and the second convex lens 120CL2 are respectively provided with movement driving means with one degree of freedom.

Alternatively, a unit body may be provided in a fixed manner in the optical system 120C of the third exemplary embodiment to set the length of the light path between the first convex lens 120CL1 and the mirror 120CM1, and the length of the light path between the mirror 120CM1 and the second convex lens 120CL2 to be the focal distance of the first or second convex lens 120CL1 or 120CL2 (in FIG. 6, the unit body is marked as a light-lined quadrangle). In this case, the unit body itself is formed to be movable and rotatable. As an example, the unit body may be provided with a movement driving of two degrees of freedom and a rotation driving means of two degrees of freedom.

Figure 7:
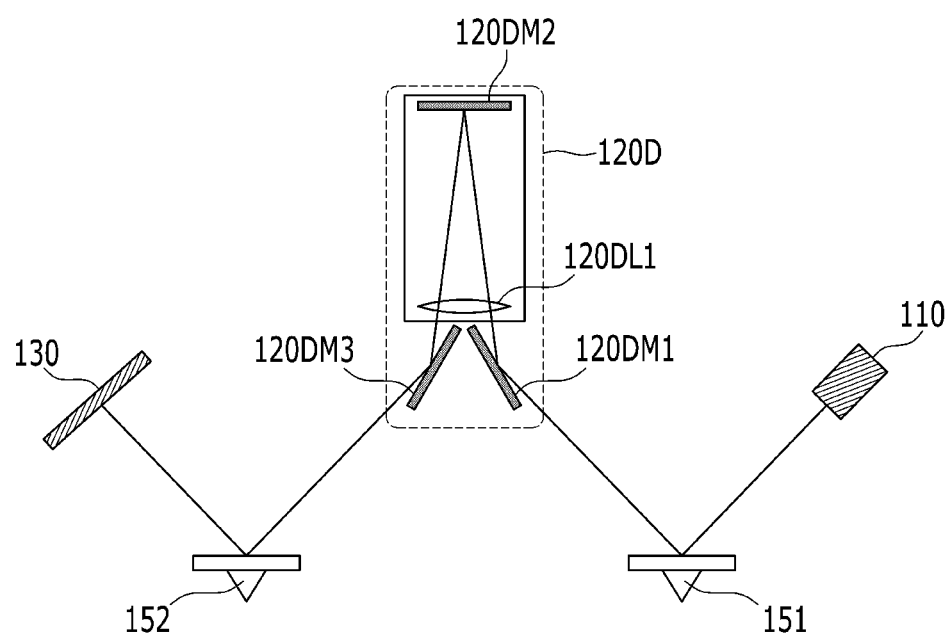
FIG. 7 illustrates a device for measuring distribution of deformation using atomic resolution according to a fourth exemplary embodiment of the present invention.

FIG. 7 shows an atomic resolution deformation distribution measurement device according to a fourth exemplary embodiment of the present invention. As shown in FIG. 7, an optical system 120D according to the fourth exemplary embodiment includes a first mirror 120DM1, a second mirror 120DM2, a third mirror 120DM3, and a convex lens 120DL1, and a laser beam generated from a laser source 110 is transmitted to a measurement unit 130 by being sequentially transmitted or reflected through a light path formed from a first cantilever 151 through the first mirror 120DM1, the convex lens 120DL1, the second mirror 120DM2, the convex lens 120DL1, and the third mirror 120DM3 to a second cantilever 152.

In this case, it is preferred that the length of the light path between the first cantilever 151, the first mirror 120DM1, and the convex lens 120DL1, the length of the light path between the convex lens 120DL1 and the second mirror 120DM2, and the length of the light path between the convex lens 120DL1, the third mirror 120DM3, and the second cantilever 152 are set to be a focal distance of the convex lens 120DL1 so as to locate the first cantilever 151 and the second cantilever 152 to an image point in the optical system 120D of the fourth exemplary embodiment.

In this case, in the optical system 120D of the fourth exemplary embodiment, the second mirror 120DM2 and the convex lens 120DL1 are formed to be movable and the second mirror 120DM2 is formed to be rotatable. As an example, the second mirror 120DM2 is provided with a movement driving means with one degree of freedom and a rotation driving means with two degrees of freedom, and the convex lens 120DL1 may be provided with a movement driving means with one degree of freedom.

Alternatively, a unit body may be provided in a fixed manner in the optical system 120D of the fourth exemplary embodiment to set the length of the light path between the convex lens 120DL1, and the second mirror 120DM2 to be the focal distance of the convex lens 120DL1 (in FIG. 7, the unit body is marked as a light-lined quadrangle). In this case, the unit body itself is formed to be movable and rotatable. As an example, the unit body may be provided with a movement driving means with one degree of freedom and a rotation driving means with two degrees of freedom.

Figure 8:
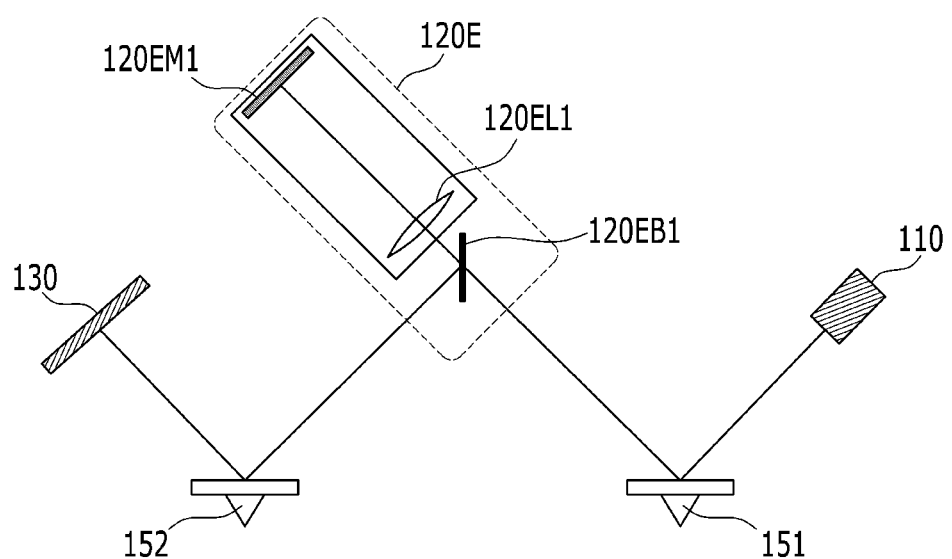
FIG. 8 illustrates a device for measuring distribution of deformation using atomic resolution according to a fifth exemplary embodiment of the present invention.

FIG. 8 shows an atomic resolution deformation distribution measurement device according to a fifth exemplary embodiment of the present invention. As shown in FIG. 8, an optical system 120E according to the fifth exemplary embodiment includes a mirror 120EM1, a convex lens 120EL1, and a beam splitter 120EB1, and a light path is formed such that laser beam generated from a laser source 110 is transmitted to a measurement unit 130 by being sequentially transmitted or reflected through a first cantilever 151, the beam splitter 120EB1, the convex lens 120EL1, the mirror 120EM1, the convex lens 120EL1, the beam splitter 120EB1, and the second cantilever 152. In the optical system 120E according to the fifth exemplary embodiment, the beam splitter 120EB1 is provided instead of the first mirror 120DM1 and the third mirror 120DM3.

In this case, in the optical system 120E according to the fifth exemplary embodiment, it is preferred that the length of the light path between the first cantilever 151, the beam splitter 120EB1, and the convex lens 120EL1, the length of the light path between the convex lens 120EL1 and the mirror 120EM1, and the length of the light path between the convex lens 120EL1, the beam splitter 120EB1, and the second cantilever 152 are respectively set to be a focal distance of the convex lens 120EL1 so as to locate the first cantilever 151 and the second cantilever 152 to an image point.

The mirror 120EM1 and the convex lens 120EL1 are formed to be movable, and the mirror 120EM1 is formed to be rotatable in the optical system 120E of the fifth exemplary embodiment. As an example, the mirror 120EM1 may be provided with a movement driving means with one degree of freedom and a rotation driving means of two degrees of freedom, and the convex lens 120EL1 may be provided with a movement driving means with one degree of freedom.

Alternatively, a unit body may be formed in a fixed manner in the optical system 120E of the fifth exemplary embodiment to set the length of the light path between the convex lens 120EL1 and the mirror 120EM1 to be the focal distance of the convex lens 120EL1 (in FIG. 8, the unit body is marked as a light-lined quadrangle). In this case, the unit body itself is formed to be movable and rotatable. As an example, the unit body may be provided with a movement driving means of one degree of freedom and a rotation driving means of two degrees of freedom.

Figure 9:
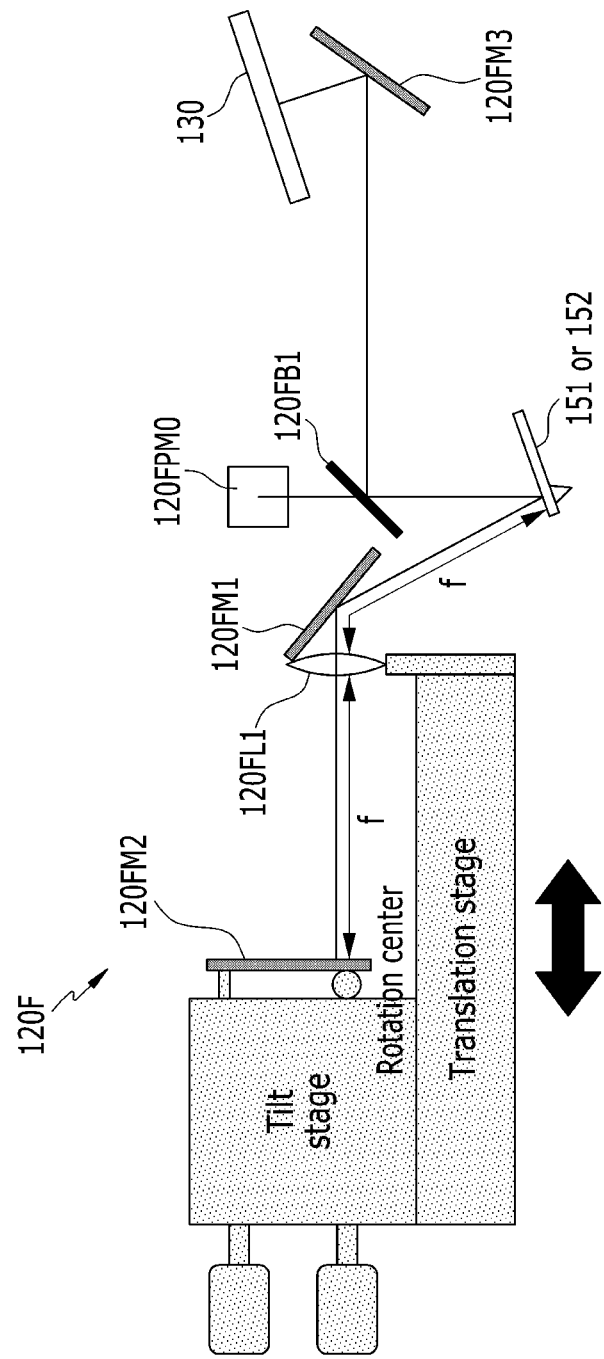
FIG. 9 illustrates a device for measuring distribution of deformation using atomic resolution according to a sixth exemplary embodiment of the present invention.

FIG. 9 shows an atomic resolution deformation distribution measurement device according to a sixth exemplary embodiment of the present invention. As shown in FIG. 9, an optical system 120F according to the sixth exemplary embodiment includes a first mirror 120FM1, a second mirror 120FM2, a third mirror 120FM3, a convex lens 120FL1, a prism 120FPM0, and a beam splitter 120FB1, and a light path is formed such that laser beam generated from a laser source 110 is transmitted to a measurement unit 130 by being sequentially transmitted or reflected through the prism 120FPM0, the beam splitter 120FB1, a first cantilever 151, the first mirror 120FM1, the convex lens 120FL1, the second mirror 120FM2, the convex lens 120FL1, the first mirror 120FM1, a second cantilever 152, the beam splitter 120FB1, and the third mirror 120FM3. The optical system 120F of the sixth exemplary embodiment may be a deformation of the optical system 120D of the fourth exemplary embodiment. FIG. 9 is a side view of a stereoscopic structure, and while it appears that that the first cantilever 151 and the second cantilever 152 are overlapped with each other, but substantially the first cantilever 151 and the second cantilever 152 are separated from each other along a direction of the depth of the drawing.

In this case, the length of the light path between the first cantilever 151, the first mirror 120FM1, and the convex lens 120FL1, the length of the light path between the convex lens 120FL1 and the second mirror 120FM2, the length of the light path between the convex pens 120FL1, the first mirror 120FM1, and the second cantilever 152, are preferably respectively set to be a focal distance of the convex lens 120FL1 in the optical system 120F of the sixth exemplary embodiment.

The second mirror 120FM2 and the convex lens 120FL1 are formed to be movable, and the second mirror FM2 and the beam splitter 120FB1 are formed to be rotatable in the optical system 120F of the sixth exemplary embodiment. In particular, FIG. 9 illustrates an exemplary alignment of a movement driving means and a rotation driving means, and although it is not illustrated in FIG. 9, the beam splitter 120FB1 may be provided with a rotation driving means with two degrees of freedom.

Figure 10:
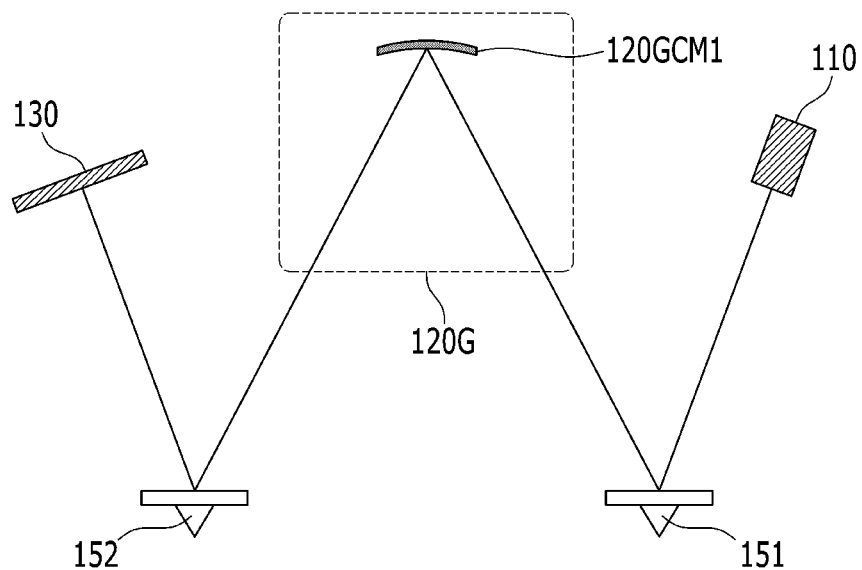
FIG. 10 illustrates a device for measuring distribution of deformation using atomic resolution according to a seventh exemplary embodiment of the present invention.
Figure 11:
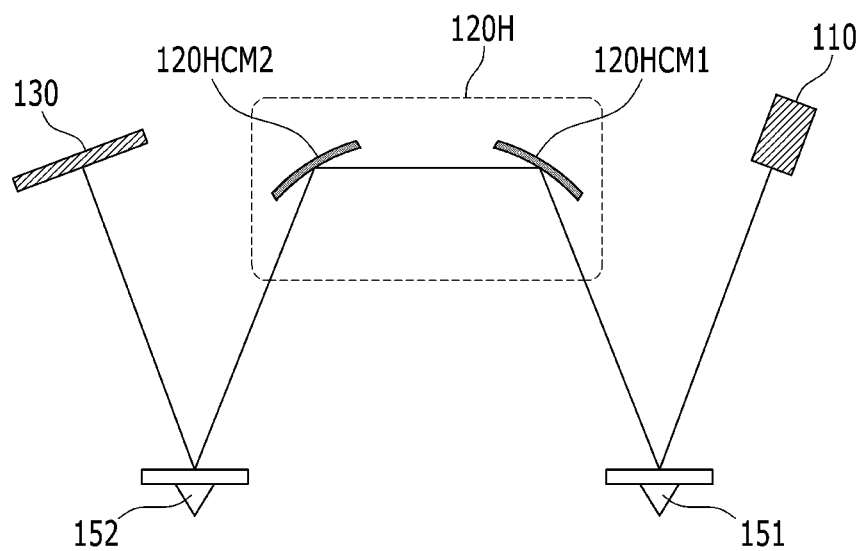
FIG. 11 illustrates a device for measuring distribution of deformation using atomic resolution according to an eighth exemplary embodiment of the present invention.

FIG. 10 and FIG. 11 respectively illustrate an optical system including at least one concave mirror according to seventh and eighth exemplary embodiments of the present invention.

FIG. 10 shows an atomic resolution deformation distribution measurement device according to a seventh exemplary embodiment of the present invention. As shown in FIG. 10, an optical system 120G of the seventh exemplary embodiment includes a concave mirror 120GCM1, and a light path is formed such that a laser beam generated from a laser beam 110 is transmitted to a measurement unit 130 by being sequentially transmitted or reflected through a first cantilever 151, the concave mirror 120 GCM1, and a second cantilever 152.

In this case, the length of the light path between the first cantilever 151 and the concave mirror 120GCM1 and the length of the light path between the concave mirror 120GCM1 and the second cantilever 152 are preferably respectively set to be two times a focal distance of the concave mirror 120GCM2 so as to locate the first cantilever 151 and the second cantilever 152 to an image point.

In the optical system 120G, the concave mirror 120GCM1 is formed to be movable and rotatable. As an example, the concave mirror 120GCM1 may be provided with a movement driving means with two degrees of freedom and a rotation driving means with two degrees of freedom.

FIG. 11 shows an atomic resolution deformation distribution measurement device according to an eighth exemplary embodiment of the present invention. As shown in FIG. 11, an optical system 120H according to the eighth exemplary embodiment includes a first concave mirror 120HCM1 and a second concave mirror 120HCM2, and a light path is formed such that a laser beam generated from a laser source 110 is transmitted to a measurement unit 130 by being transmitted or reflected through a first cantilever 151, the first concave mirror 120HCM1, the second concave mirror 120HCM2, and a second cantilever 152.

In this case, the length of the light path between the first cantilever 151 and the first concave mirror 120HCM1 and the length of the light path between the second concave mirror 120HCM2 and the second cantilever 152 are preferably respectively set to be a focal distance of the concave mirror, and the length of the light path between the first concave mirror 120HCM1 and the second concave mirror 120HCM2 is preferably set to be two times the focal distance of the concave mirror so as to locate the first cantilever 151 and the second cantilever 152 to an image point in the optical system 120H in the eighth exemplary embodiment.

In this case, the first concave mirror 120HCM1 and the second concave mirror 120HCM2 are formed to be movable and the second concave mirror 120HCM2 is formed to be rotatable in the optical system 120H. As an example, the first concave mirror 120HCM1 may be provided with a movement driving means with one degree of freedom and the second concave mirror 120HCM2 may be provided with a rotation driving means with two degrees of freedom.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An atomic resolution deformation distribution measurement device comprising:
    a laser source generating a laser beam;
    a first cantilever and a second cantilever provided close to a measurement specimen or a reference specimen to cause deformation by an atomic force;
    an optical system controlling a light path of the laser beam so as to cause the laser beam to be sequentially reflected to the first cantilever and the second cantilever and locate the first cantilever and the second cantilever to an image point; and
    a measurement unit measuring the laser beam reflected from the second cantilever; and
    a stage on which a measurement specimen or a reference specimen is located and movable in X, Y, and Z axis directions.

2. The atomic resolution deformation distribution measurement device of claim 1,
    wherein one of the first cantilever and the second cantilever is located on the measurement specimen and the other is located on the reference specimen, and
    the measurement measures a result of overlapping of atom lattice location data of a surface of the measurement specimen and atom lattice location data of a surface of the reference specimen so as to measure atom lattice data of the measurement specimen that is deformed with respect to the atom lattice of the reference specimen.

3. The atomic resolution deformation distribution measurement device of claim 1, wherein the optical system comprises at least one mirror and at least one convex lens.

4. The atomic resolution deformation distribution measurement device of claim 3, wherein the optical system comprises a mirror and a convex lens, and
    forms a light path through such that the laser beam generated from the laser source is transmitted to the measurement device by being sequentially transmitted or reflected through the first cantilever, the mirror, the convex lens, and the second cantilever.

5. The atomic resolution deformation distribution measurement device of claim 4, wherein, in the optical system, the length of the light path between the first cantilever, the mirror, and the convex lens and the length of the light path between the convex lens and the second cantilever are respectively set to be two times a focal distance of the convex lens.

6. The atomic resolution deformation distribution measurement device of claim 5, wherein, in the optical system, the mirror and the convex lens are formed to be movable and the mirror is formed to be rotatable.

7. The atomic resolution deformation distribution measurement device of claim 3, wherein the optical system comprises a first mirror, a second mirror, and a convex lens, and forms a light path such that laser beam generated from the laser source is transmitted to the measurement device by being sequentially transmitted or reflected through the first cantilever, the first mirror, the convex lens, the second mirror, and the second cantilever.

8. The atomic resolution deformation distribution measurement device of claim 7, wherein, in the optical system,
    the length of the light path between the first cantilever, the first mirror, and the convex lens and the length of the light path between the convex lens, the second mirror, and the second cantilever are respectively set to be two times the focal distance of the convex lens.

9. The atomic resolution deformation distribution measurement device of claim 8, wherein, in the optical system, the first mirror and the second mirror are formed to be movable and rotatable.

10. The atomic resolution deformation distribution measurement device of claim 3, wherein the optical system comprises a mirror, a first convex lens, and a second convex lens, and forms a light path such that the laser beam generated from the laser source is transmitted to the measurement unit by being sequentially transmitted or reflected through the first cantilever, the first convex lens, the mirror, the second convex lens, and the second cantilever.

11. The atomic resolution deformation distribution measurement device of claim 10, wherein, in the optical system, the first convex lens and the second convex lens respectively have the same focal distance.

12. The atomic resolution deformation distribution measurement device of claim 11, wherein, in the optical system,
    the length of the light path between the first cantilever and the first convex lens, and the length of the light path between the second convex lens and the second cantilever are respectively set to be a focal distance of the first convex lens or a focal distance of the second convex lens, and
    the length of the light path between the first convex lens, the mirror, and the second convex lens are set to be two times the focal distance of the first convex lens or a focal distance of the second convex lens.

13. The atomic resolution deformation distribution measurement device of claim 12, wherein, in the optical system, the mirror, the first convex lens, and the second convex lens are formed to be movable and the mirror is formed to be rotatable.

14. The atomic resolution deformation distribution measurement device of claim 12, wherein a unit body is provided in a fixed manner in the optical system to set the length of the light path between the first convex lens, the mirror, and the second convex lens to be two times the focal distance of the first convex lens or the focal distance of the second convex lens, and
    the unit body is formed to be movable and rotatable.

15. The atomic resolution deformation distribution measurement device of claim 3, wherein the optical system comprises a first mirror, a second mirror, a third mirror, and a convex lens, and
    forms a light path such that the laser beam generated from the laser source is transmitted to the measurement unit by being sequentially transmitted or reflected through the first cantilever, the first mirror, the convex lens, the second mirror, the convex lens, the third mirror, and the second cantilever.

16. The atomic resolution deformation distribution measurement device of claim 15, wherein, in the optical system,
    the length of the light path between the first cantilever, the first mirror, and the convex lens,
    the length of the light path between the convex lens and the second mirror, and
    the length of the light path between the convex lens, the third mirror, and the second cantilever are respectively set to be a focal distance of the convex lens.

17. The atomic resolution deformation distribution measurement device of claim 16, wherein, in the optical system, the second mirror and the convex lens are formed to be movable and the second mirror is formed to be rotatable.

18. The atomic resolution deformation distribution measurement device of claim 16, wherein the optical system comprises a unit body formed in a fixed manner to set the length of the light path between the convex lens and the second mirror to be the focal distance of the convex lens.

19. The atomic resolution deformation distribution measurement device of claim 3, wherein the optical system comprises a mirror, a convex lens, and a beam splitter, and
   forms a light path such that the laser beam generated from the laser source is transmitted to the measurement unit by being sequentially transmitted or reflected through the first cantilever, the beam splitter, the convex lens, the mirror, the convex lens, the beam splitter, and the second cantilever.

20. The atomic resolution deformation distribution measurement device of claim 19, wherein, in the optical system,
   the length of the light path between the first cantilever, the beam splitter, and the convex lens,
   the length of the light path between the convex lens and the mirror, and
   the length of the light path between the convex lens, the beam splitter, and the second cantilever are set to be a focal distance of the convex lens.

21. The atomic resolution deformation distribution measurement device of claim 20, wherein, in the optical system,
   the mirror and the convex lens are formed to be movable and the mirror is formed to be rotatable.

22. The atomic resolution deformation distribution measurement device of claim 20, wherein the optical system comprises a unit body formed in a fixed manner to set the length of the light path between the convex lens and the mirror to be the focal distance of the convex lens, and
   the unit body is formed to be movable and rotatable.

23. The atomic resolution deformation distribution measurement device of claim 3, wherein the optical system comprises a first mirror, a second mirror, a third mirror, a convex lens, a prism, and a beam splitter, and
   forms a light path such that the laser beam generated from the laser beam is transmitted to the measurement unit by being sequentially transmitted and reflected through the prism, the beam splitter, the first cantilever, the first mirror, the convex lens, the second mirror, the convex lens, the first mirror, the second cantilever, the beam splitter, and the second mirror.

24. The atomic resolution deformation distribution measurement device of claim 23, wherein, in the optical system,
   the length of the light path between the first cantilever, the first mirror, and the convex lens,
   the length of the light path between the convex lens and the second mirror, and
   the length of the light path between the convex lens, the first mirror, and the second cantilever are respectively set to be the focal distance of the convex lens.

25. The atomic resolution deformation distribution measurement device of claim 24, wherein, in the optical system, the second mirror and the convex lens are formed to be movable and the second mirror and the beam splitter are formed to be rotatable.

26. The atomic resolution deformation distribution measurement device of claim 1, wherein the optical system comprises at least one concave mirror.

27. The atomic resolution deformation distribution measurement device of claim 26, wherein the optical system comprises a concave mirror, and
   forms a light path such that the laser beam generated from the laser source is transmitted to the measurement unit by being sequentially transmitted or reflected through the first cantilever, the concave mirror, and the second cantilever.

28. The atomic resolution deformation distribution measurement device of claim 27, wherein, in the optical system,
   the length of the light path between the first cantilever and the concave mirror and
   the length of the light path between the concave mirror and the second cantilever are set to be two times a focal distance of the concave mirror.

29. The atomic resolution deformation distribution measurement device of claim 28, wherein, in the optical system, the concave mirror is formed to be movable and rotatable.

30. The atomic resolution deformation distribution measurement device of claim 26, wherein the optical system comprises a first concave mirror and a second concave mirror, and
   forms a light path such that the laser beam generated from the laser source is transmitted to the measurement unit by being sequentially transmitted or reflected through the first cantilever, the first concave mirror, the second concave mirror, and the second cantilever.

31. The atomic resolution deformation distribution measurement device of claim 30, wherein, in the optical system,
   the length of the light path between the first cantilever and the first concave mirror and
   the length of the light path between the second concave mirror and the second cantilever are respectively set to be the focal distance of the concave mirror, and
   the length of the light path between the first concave mirror and the second concave mirror is set to be two times the focal distance of the concave mirror.

32. The atomic resolution deformation distribution measurement device of claim 31, wherein, in the optical system,
   the first concave mirror and the second concave mirror are formed to be movable and
   the second concave mirror is formed to be rotatable.

33. The atomic resolution deformation distribution measurement device of claim 1, wherein the measurement unit is a position sensitive photodiode detector (PSPD).

34. The atomic resolution deformation distribution measurement device of claim 1, wherein the stage is connected with the measurement unit and is movable in the Z-axis direction by being fed back based on a measurement value of the laser beam measured by the measurement unit.

35. A method for measuring an atomic resolution deformation distribution using the device of claim 1, comprising:
   disposing one of the first cantilever and the second cantilever on a measurement specimen and the other on a reference specimen;
   controlling a light path for the laser beam generated from the laser source by the optical system to sequentially reflect the laser beam to the first cantilever and the second cantilever; and
   measuring the laser beam reflected from the second cantilever and then transmitted to the measurement unit.

36. The method of claim 35, wherein the measurement unit measures a result of overlapping of atom lattice location data of a surface of a measurement specimen and atom lattice location data of a surface of a reference specimen so as to measure atom lattice data of a measurement specimen that is deformed with respect to the atom lattice of the reference specimen.

37. The method of claim 36, further comprising:

calculating the square of a measurement signal transmitted to the measurement unit;

eliminating noise by passing the square of the measurement through a low-pass filter;

digitalizing the square of the measurement signal of which noise is eliminated through an analog-to-digital converter; and converting an atomic lattice structure of the measurement specimen that is deformed with respect to the atomic lattice of the reference specimen using the digitalized value.

* * * * *